Figure 1:
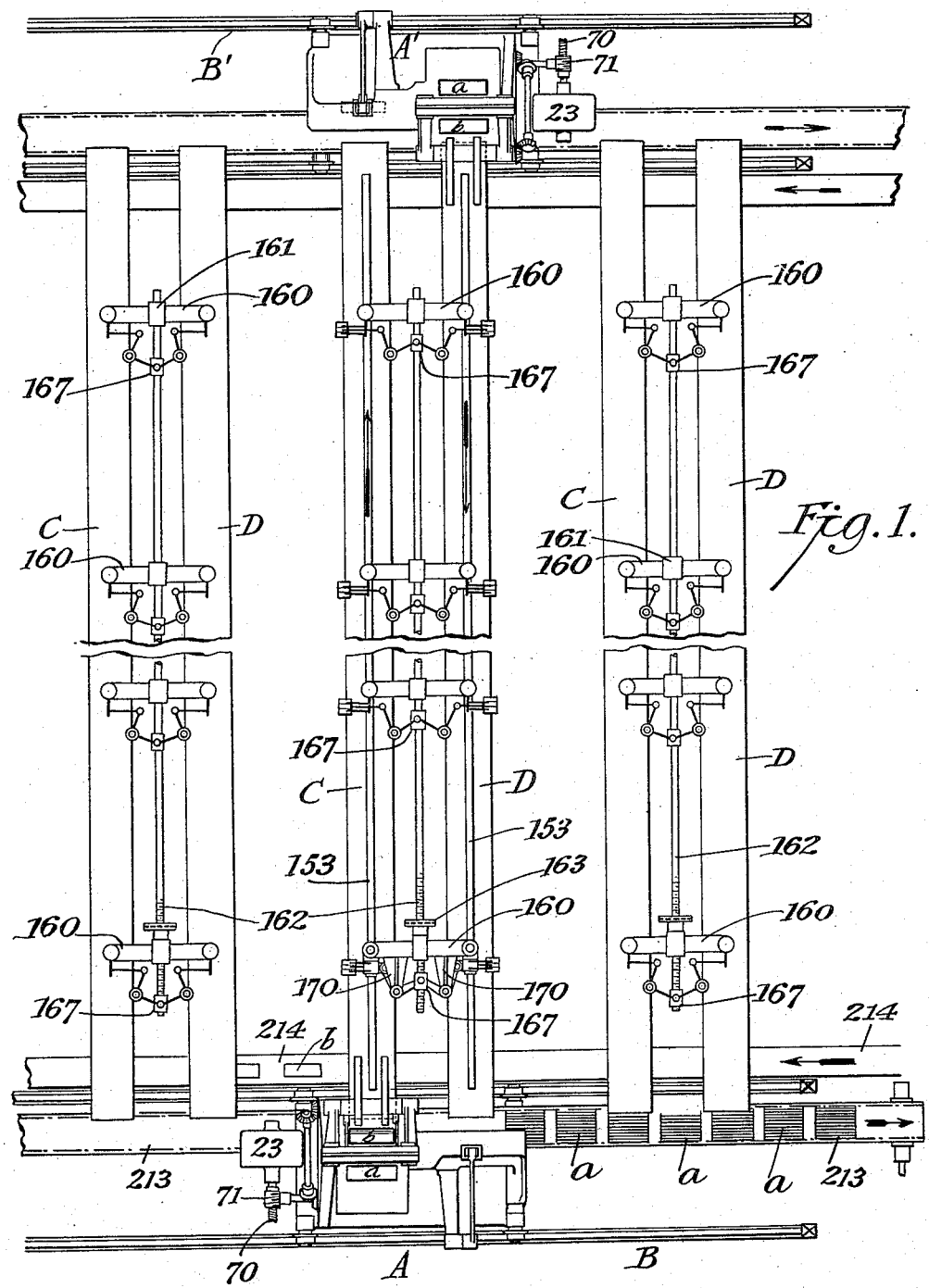

R. B. DULA.
APPARATUS FOR PRESSING AND FINISHING PLUG TOBACCO.
APPLICATION FILED FEB. 19, 1914.

1,154,914. Patented Sept. 28, 1915.
10 SHEETS—SHEET 1.

Inventor
Robert B. Dula
By his Attorneys
Meyers, Cushman & Rea

R. B. DULA.
APPARATUS FOR PRESSING AND FINISHING PLUG TOBACCO.
APPLICATION FILED FEB. 19, 1914.

1,154,914.

Patented Sept. 28, 1915.
10 SHEETS—SHEET 2.

R. B. DULA.
APPARATUS FOR PRESSING AND FINISHING PLUG TOBACCO.
APPLICATION FILED FEB. 19, 1914.

1,154,914.

Patented Sept. 28, 1915.
10 SHEETS—SHEET 3.

Witnesses:
W. H. Hawkins.
A. R. Appleman.

Inventor
Robert B. Dula
By his Attorneys
Meyers, Cushman & Rea

R. B. DULA.
APPARATUS FOR PRESSING AND FINISHING PLUG TOBACCO.
APPLICATION FILED FEB. 19, 1914.

1,154,914.

Patented Sept. 28, 1915.
10 SHEETS—SHEET 4.

R. B. DULA.
APPARATUS FOR PRESSING AND FINISHING PLUG TOBACCO.
APPLICATION FILED FEB. 19, 1914.

1,154,914.

Patented Sept. 28, 1915.
10 SHEETS—SHEET 5.

R. B. DULA.
APPARATUS FOR PRESSING AND FINISHING PLUG TOBACCO.
APPLICATION FILED FEB. 19, 1914.

1,154,914.

Patented Sept. 28, 1915.
10 SHEETS—SHEET 8.

Witnesses:
A. R. Appleman
W. H. Hawkins.

Inventor
Robert B. Dula
By his Attorneys
Meyers, Cushman & Rea

R. B. DULA.
APPARATUS FOR PRESSING AND FINISHING PLUG TOBACCO.
APPLICATION FILED FEB. 19, 1914.
1,154,914.
Patented Sept. 28, 1915.
10 SHEETS—SHEET 9.
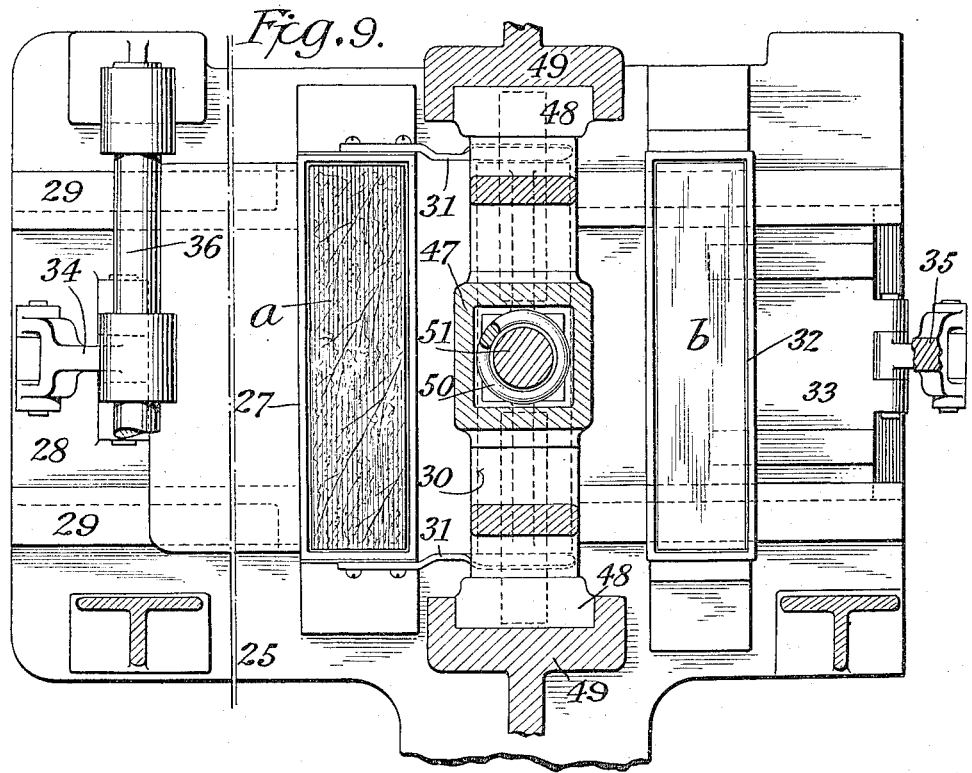
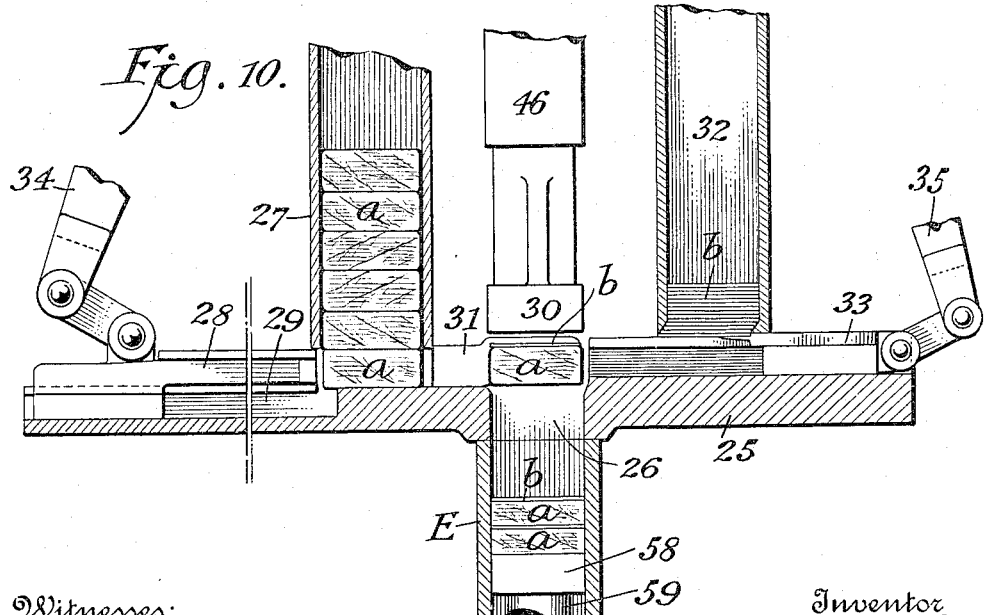
Witnesses:
A. R. Appleman
W. H. Hawkins
Inventor
Robert B. Dula
By his Attorneys
Meyers, Cushman & Rea R. B. DULA.
APPARATUS FOR PRESSING AND FINISHING PLUG TOBACCO.
APPLICATION FILED FEB. 19, 1914.
1,154,914.
Patented Sept. 28, 1915.
10 SHEETS—SHEET 10.
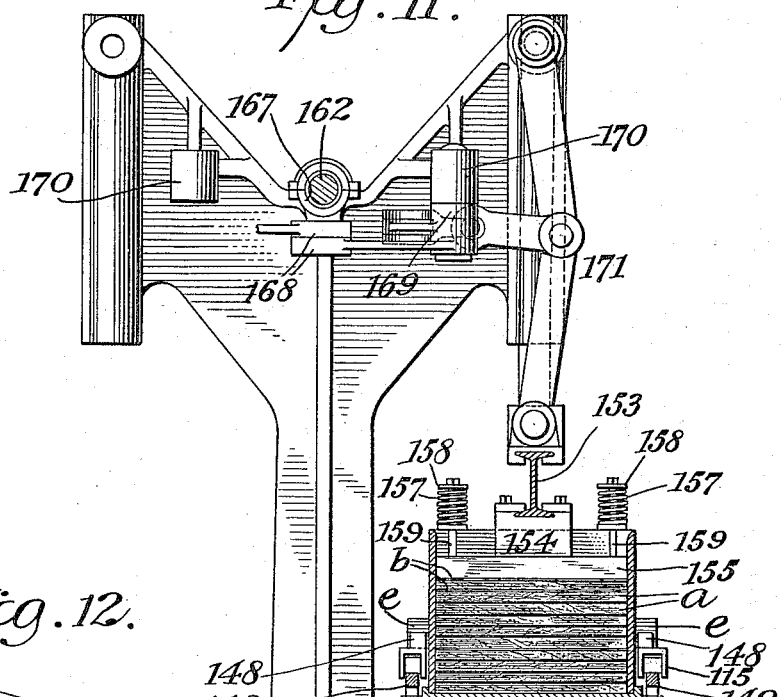
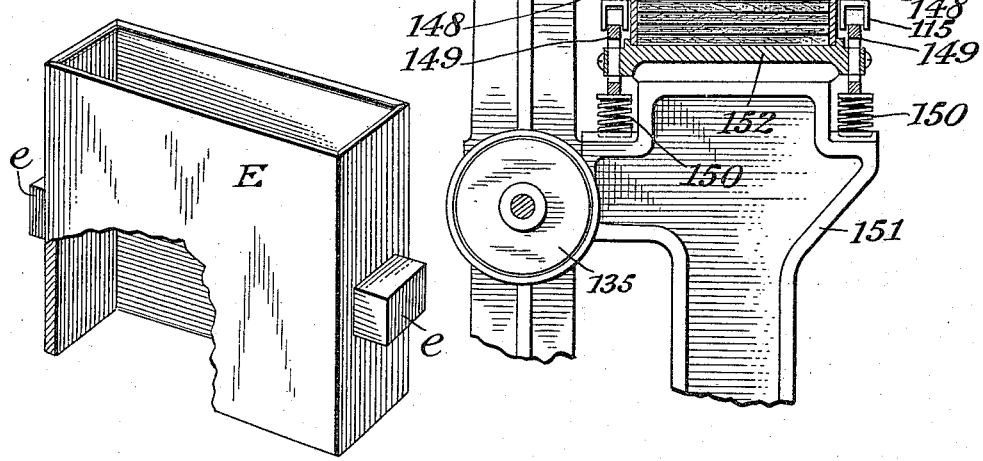

UNITED STATES PATENT OFFICE.

ROBERT B. DULA, OF TARRYTOWN, NEW YORK.

APPARATUS FOR PRESSING AND FINISHING PLUG-TOBACCO.

1,154,914.   Specification of Letters Patent.   Patented Sept. 28, 1915.

Application filed February 19, 1914. Serial No. 819,729.

*To all whom it may concern:*

Be it known that I, ROBERT B. DULA, a citizen of the United States, residing at Tarrytown, in the county of Westchester and State of New York, have invented new and useful Improvements in Apparatus for Pressing and Finishing Plug-Tobacco, of which the following is a specification.

This invention relates generally to tobacco pressing and finishing machines, and more particularly to a system and apparatus for pressing plug tobacco and holding the plugs under continuous pressure in a form box for a sufficient time to destroy the resiliency of the tobacco, and cause the plugs to set; then ejecting the plugs from said form boxes onto a conveyer belt to be carried from the machine to packers who receive the plugs and pack them in cases for the market.

The object of the invention is to provide in a single plant, duplicate machine for feeding plugs of tobacco into form boxes one at a time, subjecting each plug to pressure as it enters the box. Upon filling the boxes, they are delivered to a slowly traveling belt conveyer of any desired length, which when filled with boxes of plugs, is stopped and a pressure mechanism actuated by power subjects the plugs in each box to a continuous pressure for several hours, or until the plugs are set, whereupon the pressure is released, the conveyer again started and the boxes containing pressed and finished plugs removed from the delivery end of each conveyer, at the same time newly filled boxes are placed on the other end. The finished plugs, after the boxes have been taken from the conveyer and placed below suitable ejecting means, are removed from the boxes and delivered upon a belt and thence to packers to be cased for shipment.

The several mechanisms forming this system are so combined and arranged that the operation of preliminary pressing, maintaining a pressure for a predetermined time, and ejecting the finished plugs is a continuous one insofar as the operation of the system is concerned. The machine for pressing each plug is mounted in the same frame with the ejecting means and both are operated by the same motor. This machine is movable on a track at one end of a number of pairs of conveyers, one conveyer of each pair traveling from the machine to carry away filled boxes to be subjected to pressure, and the other toward the machine to bring boxes of pressed plugs to the ejecting mechanism from a similar movable machine at the opposite ends of the conveyers. The conveyers are of any suitable length and move slowly below a pressure mechanism above each that descends when the conveyers are filled with boxes of plugs and subjects said plugs to several hours pressure, at the end of which time the plugs are set and may be released from compression. In the plant illustrated in Figure 1, the three pairs of conveyers are of a length to require an hour or more to fill with boxes so that from the time continuous pressure is applied to the boxes on the first pair of conveyers, until those on the last pair are under pressure, about three hours will elapse, the time required for the plugs to set.

Figure 2:
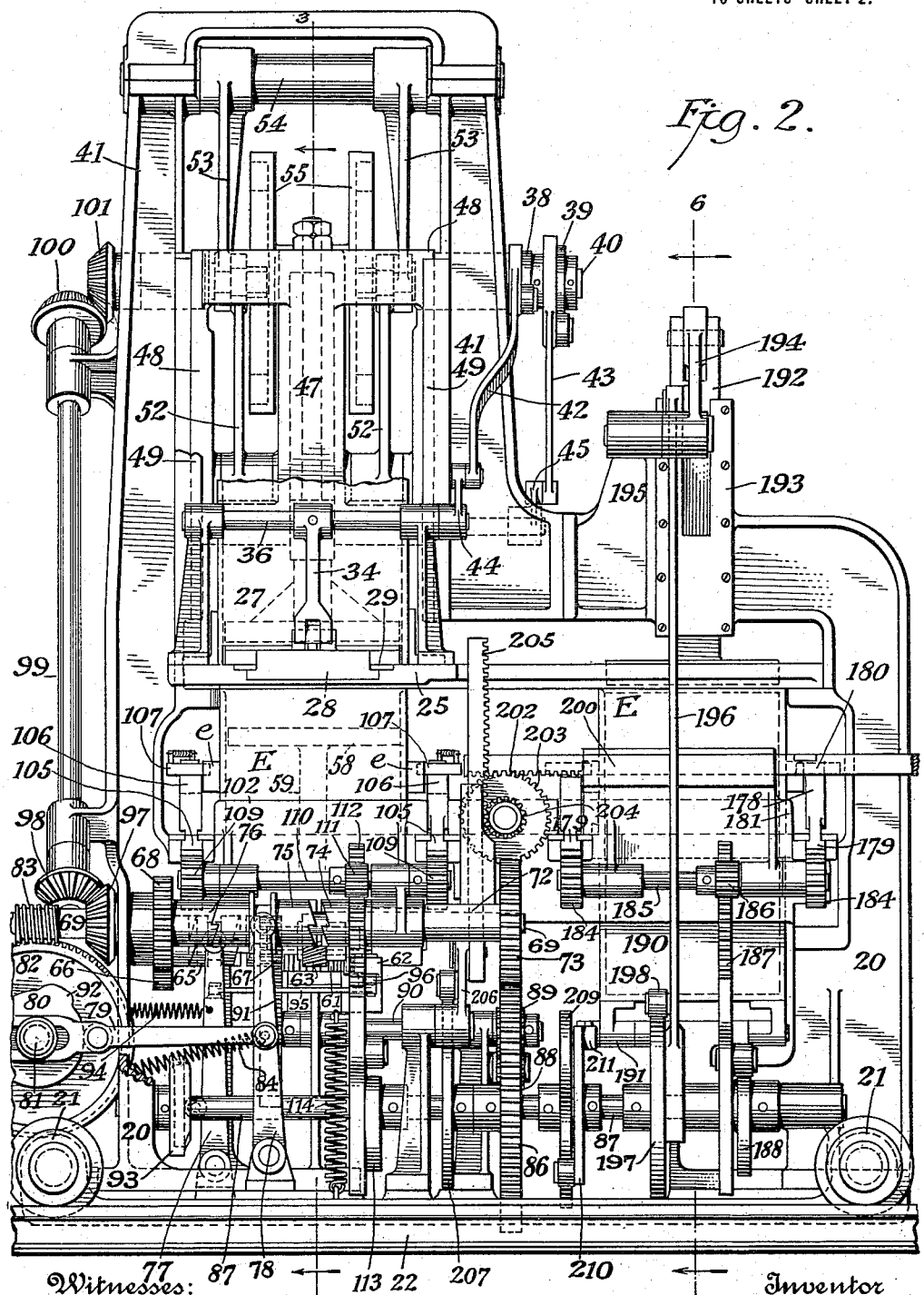
Figure 3:
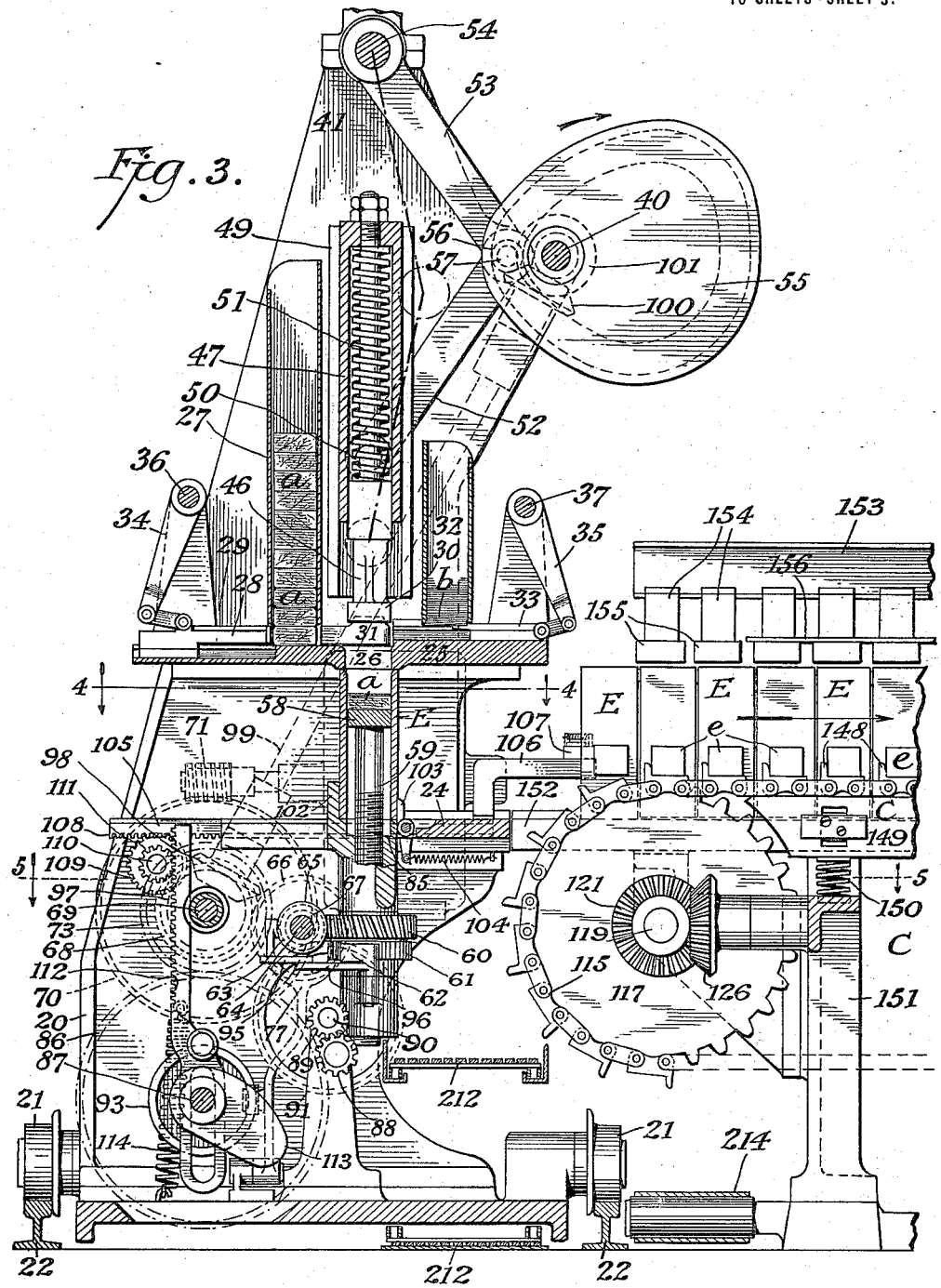
Figure 4:
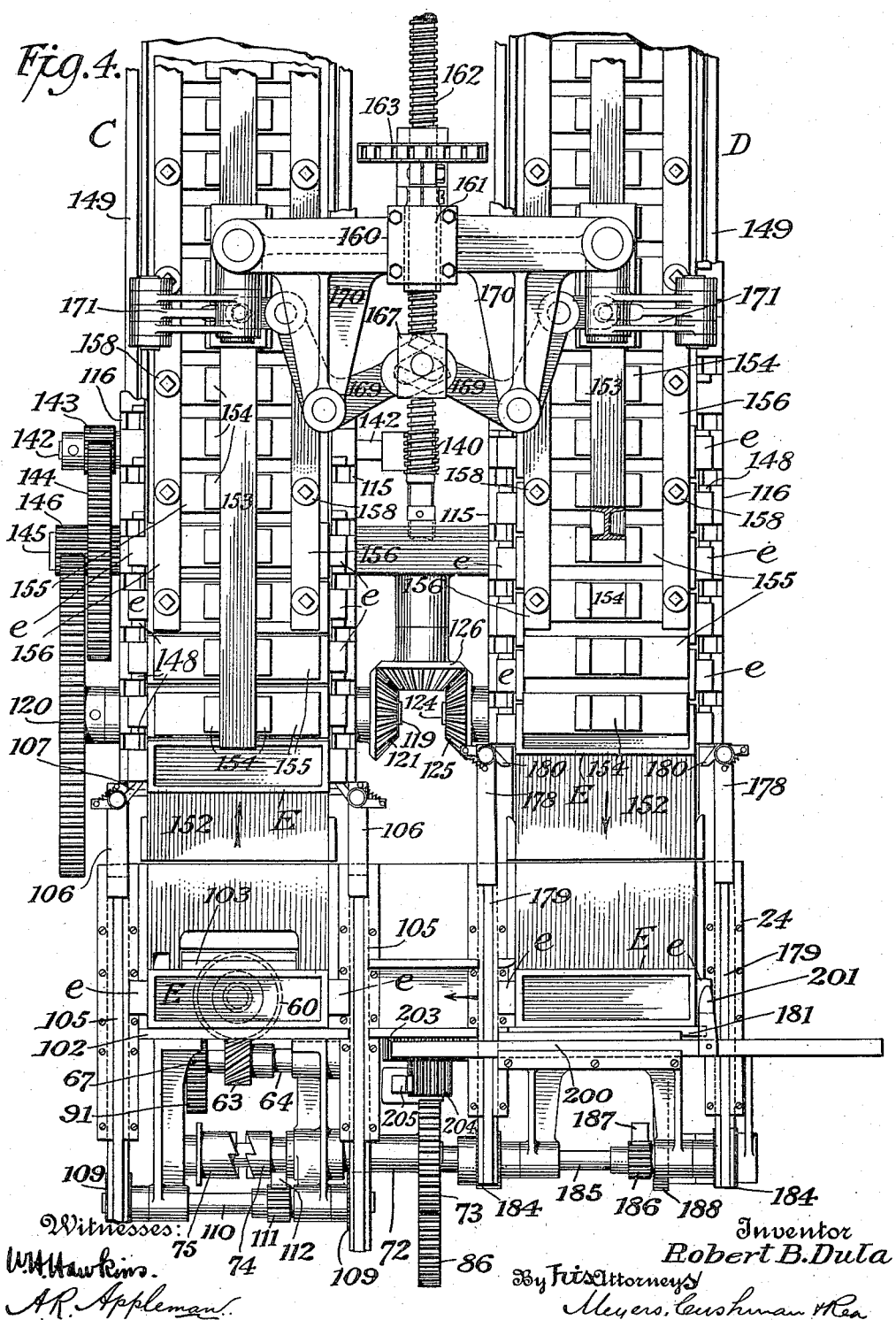
Figure 5:
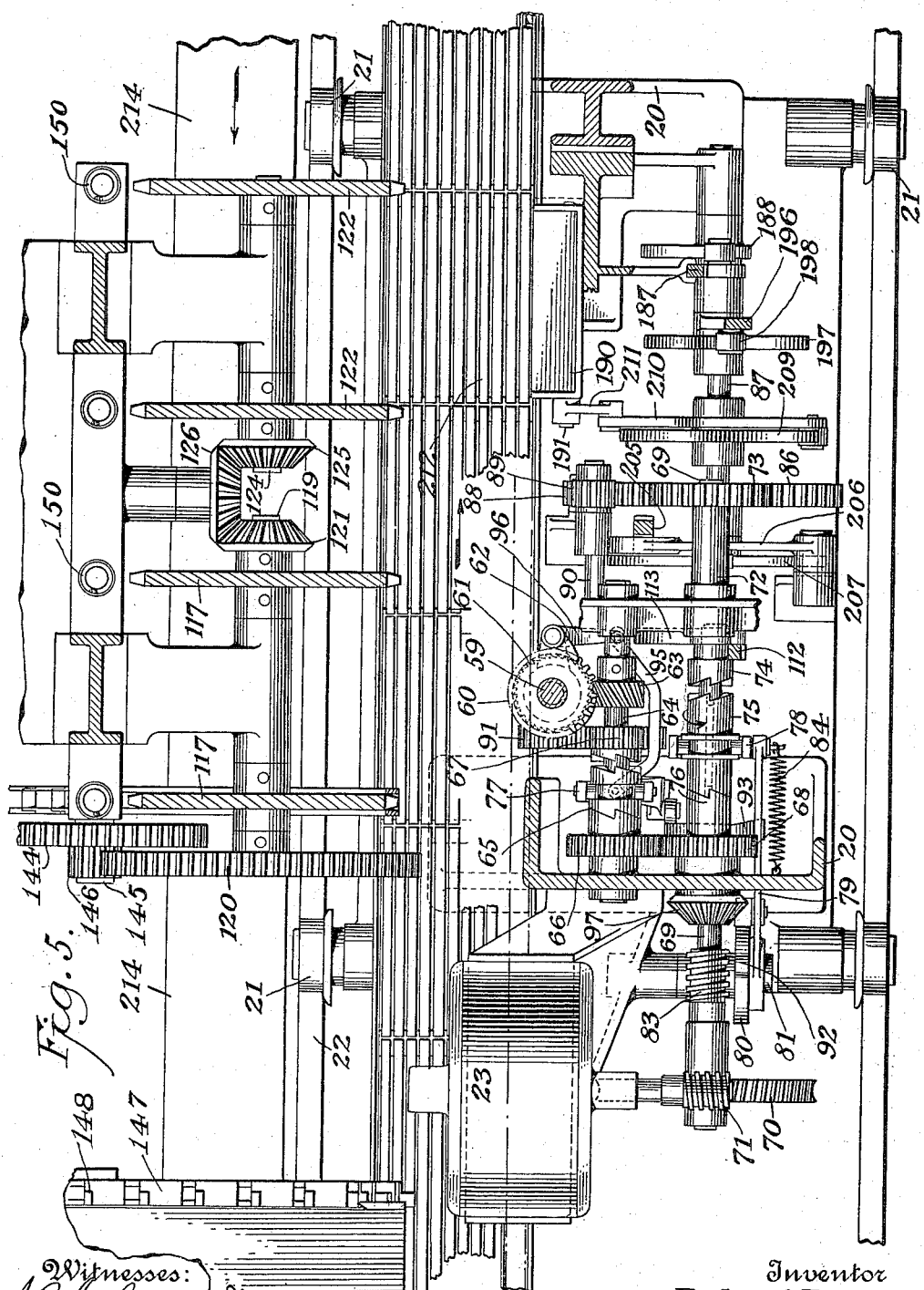
Figure 6:
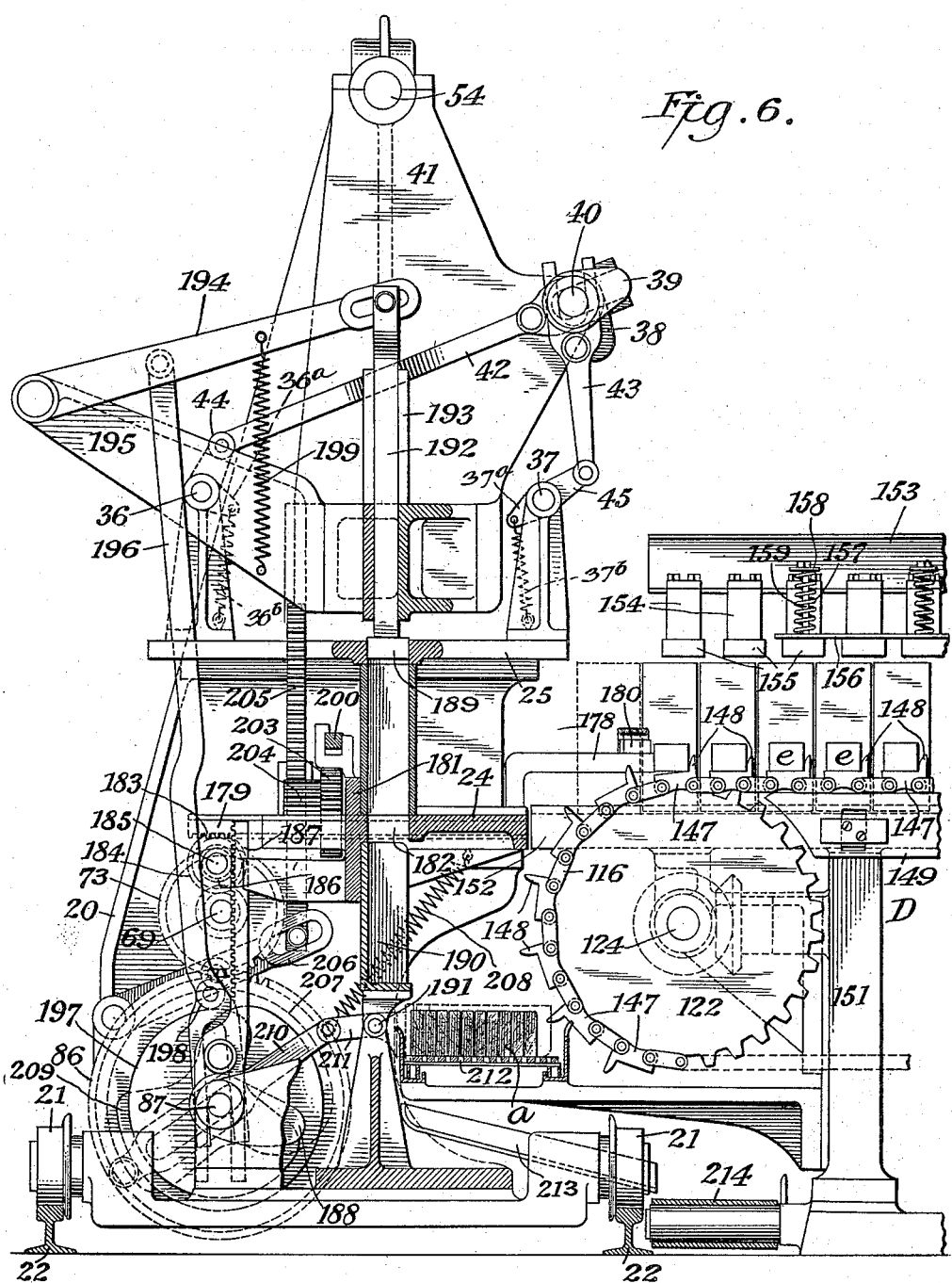
Figure 7:
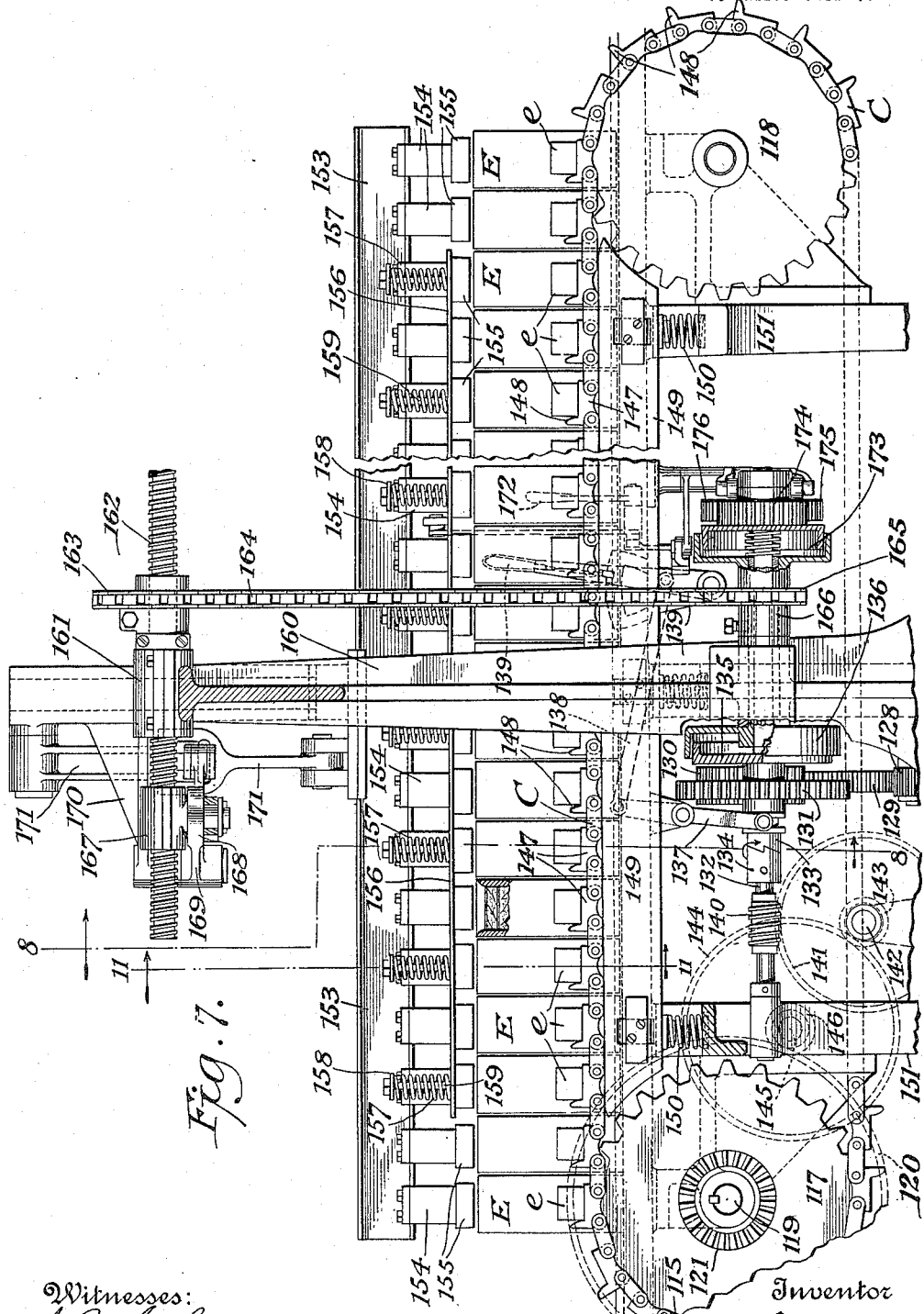
Figure 8:
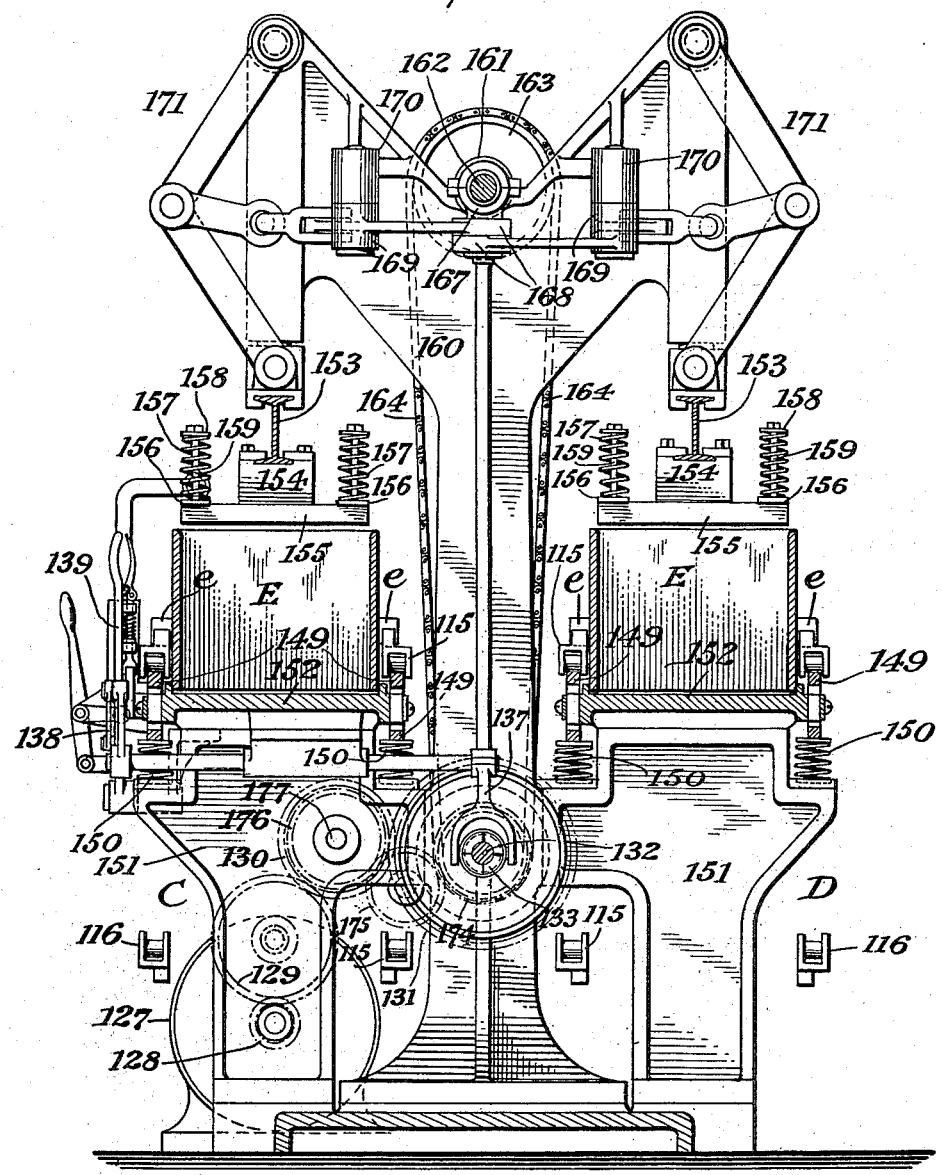

In the drawings, Fig. 1 is a diagrammatic plan view of the complete system or plant showing a plurality of oppositely moving conveyers arranged in pairs, and pressing machines at opposite ends of said conveyers mounted on wheels to be moved into operative position with any pair of said conveyers. Fig. 2 is a front elevation of the plug feeding, pressing, and ejecting machine. Fig. 3 is a vertical longitudinal sectional view on the line 3—3 of Fig. 2. Fig. 4 is a horizontal sectional view on the line 4—4 Fig. 3. Fig. 5 is a similar view on the line 5—5 but on a lower plane. Fig. 6 is a vertical sectional view of the ejecting mechanism on the line 6—6 Fig. 2. Fig. 7 is a side elevation of a portion of the belt conveying and plug pressure maintaining means. Fig. 8 is a vertical sectional view on the line 8—8 of Fig. 7. Fig. 9 is a plan view of the tobacco plug and separating plate feeding means. Fig. 10 is a vertical sectional view of the same parts. Fig. 11 is a cross sectional view taken on or about the line 11—11 of Fig. 7, showing a filled mold box under sustained compression. Fig. 12 is a perspective view of the mold box.

In the drawings, referring first to Fig. 1, A, A′ are two machines for filling form boxes with plugs of tobacco and pressing the same, and for discharging the plugs from said boxes and transferring the boxes to the filling mechanisms. The machines A, A′ are spaced apart a suitable distance, and mounted to run on tracks B, B′ respectively, past opposite ends of a series of parallel belt conveyers C, D, for carrying away the filled boxes. These belts are arranged in pairs and extend horizontally a convenient distance above the floor, three pairs of conveyers C, D, being shown for illustrative purpose, but this number may be increased or diminished in proportion to their length if it is desired to operate continuously, as by the time the last pair of conveyers are filled, the contents of boxes on the first pair should be sufficiently set for their removal.

The two machines A, A' are placed in position at the opposite ends of a pair of conveyers, which travel at proper speed, one toward each of said machines and the other away from it. Each of the conveyers at times receives filled boxes from one of the machines, and after compression takes place delivers filled boxes to the discharging mechanism by which said boxes are emptied. Each box as emptied is transferred to the filling mechanism and from thence to the outgoing conveyer. This operation is carried on at each end of the pair of conveyers until they are filled from end to end with boxes whereupon the machines are stopped and pressure applied to all the filled boxes on the two conveyers. The machines A, A' are then moved to the next pair of conveyers and the operation repeated and so on until all the conveyers are filled. The contents of the boxes on the first pair of conveyers being set by this time, the machines are returned to them and the emptying and filling operation begins again.

The various details of mechanisms and operations for performing the different steps will be described, it being understood that the machines A and A' are exactly alike and a description of one will serve for both. Likewise the several pairs of belt conveyers and the pressure devices over them are duplicate constructions one of the other.

The frame-work 20 of the machine A, carries all the box-filling, discharging and transferring mechanism and is mounted on wheels 21 that run on rails 22 of track B. Preferably, an electric motor 23 is mounted on the frame-work 20 and drives all the mechanism carried in said frame. Fastened to the frame-work 20 a suitable distance above the track wheels is a horizontal table 24 which supports the form boxes E during the filling and emptying operation, see Figs. 2 and 3. Above the table 24 is a platform 25 between which and the table is just space enough for the boxes to pass in upright position to and from an opening 26 in the platform through which plugs to be pressed and finished are fed into the boxes E. Fixed on the platform in front of the opening 26, as clearly shown in Figs. 3, 9 and 10, is a hopper 27 in which a stack of plugs to be pressed are placed. A pusher plate 28 slidable in guides 29 and arranged to pass through the bottom of the hopper at each forward movement, engages the bottom plug $a$ and carries it to the opening 26 in position to be forced therethrough and into the box E thereunder by a plunger 30. Resilient fingers 31 secured to the hopper 27, extend on each side of the opening 26 and hold each plug in position until the plunger descends. To prevent the plugs adhering under pressure and forming a more or less solid mass, a sheet metal separating plate $b$ is placed between each two plugs. These plates are contained in a hopper 32 affixed on the platform 25 at the opposite side of the opening 26 from the hopper 27 and is provided with a sliding feeder 33 of any suitable kind to engage and push the lowest plate in the hopper upon a plug before the plunger 30, descends. The pusher 28 and feeder 33 are moved to and from the opening 26 by arms 34, 35 that depend from rock shafts 36, 37, journaled in brackets bolted on the platform 25. Motion is given these shafts by two cams 38, 39, see Figs. 2 and 6, keyed on a shaft 40 turning in bearings on standards 41 forming part of the framework that extend above the platform. Bars 42, 43, each held at one end against one of said cams by a spring or other means, are connected by their other ends each to an arm 44, 45 projecting from the shafts 36, 37. To hold the bars against their cams, I prefer to provide the rock shafts 36 and 37 with arms $36^a$ and $37^a$ to which springs $36^b$ and $37^b$ are attached. The shaft 40 is geared to turn once with each operation of the machine to feed a plug $a$ and separating plate $b$ with each revolution into a box E. The means for revolving said shaft will be described later.

The plunger 30 which is substantially as long and as wide as like dimensions of the plugs $a$ and fits neatly within the box E, is attached to the lower end of a stem 46 that slides freely in a box guide 47 on the lateral sides of which are slides 48 that move freely in a vertical direction in guide channels 49 on the inner faces of standards 41. The box-guide 47 is much longer than required for the plunger stem 46 and contains a spiral spring 50 that surrounds a rod 51 projecting upward from the plunger stem through the top of said guide and fitted with nuts to adjust the height of the plunger 30 and prevent it dropping from the box-guide. The spring 50 bears on the plunger stem and will yield to prevent the plunger pressing the plugs beyond a predetermined amount. Pivoted on each side of the box-guide 47 near its lower end is a lever 52, and a lever 53 is in turn pivoted to the outer end of each lever 52 and to a cross shaft 54 extending between the standards 41. The levers 52, 53 form two toggles which are operated by two cams 55 on the shaft 40 that engage rollers 56 on the pins 57 joining the levers 52, 53. As the cams rotate, the plunger is depressed, pushes a plug $a$ and separating plate $b$ into the box E and compresses the plug. The plunger then returns to act on another plug and plate. The range of movement of the plunger is limited and does not extend to the bottom of the box E, means therefore are provided to support the plugs during the descent of the plunger which will now be described.

When a form box E, which is without top and bottom, is in position below the platform 25 and in line with the opening 26, see Fig. 3, it stands directly over a movable platen or false bottom 58 supported on the upper end of a vertical screw threaded stem 59 that passes through a threaded axial opening in a spiral gear wheel 60 revoluble in suitable bearings on the frame-work 20. A ratchet wheel 61 is fast with the spiral gear and turns with it, being held by a pawl 62 from backward rotation at certain times. The spiral gear wheel 60 is driven by an engaging spiral pinion 63 on a horizontal shaft 64 so geared that it will turn in either direction for the purpose of raising and lowering the platen 58. Keyed on the shaft 64 to turn therewith and slide longitudinally thereon is a clutch member 65, see Figs. 2, 4 and 5, having a set of clutch teeth on each end. Revolving freely on the same shaft but held against longitudinal movement is a gear wheel 66 on one side of the clutch member 65 with clutch teeth on its hub, and a pinion 67 on the other side also provided with clutch teeth. The gear wheel and pinion are driven in opposite directions so that with whichever one the clutch member is engaged, the shaft 64 will turn correspondingly. The gear wheel 66 is in mesh with a gear wheel 68 of the same diameter loose on a shaft 69, which shaft is revolved through a worm wheel 70 thereon driven by a worm 71 on the shaft of motor 23. On the other end of shaft 69 is a sleeve 72, Fig. 2, turning freely thereon. One end of said sleeve has a gear wheel 73 fixed thereon and a series of clutch teeth 74 on the other end. Keyed on shaft 69 to turn therewith and slide longitudinally is a clutch coupling 75 that when moved in one direction engages clutch teeth 76 on the hub of gear wheel 68 and rotates said wheel and when slid in the other direction engages the clutch teeth 74 and turns the gear wheel 73. The clutch member 65 is operated at the proper time through a lever 77; a similar lever 78 actuates the clutch member 75. A rod 79 connected to the lever 78 is operated by a cam 80 on a short shaft 81 carrying a worm wheel 82 rotated by a worm 83 on the positively and continuously driven shaft 69. During the operation of filling the boxes E, the clutch member 75 is held coupled to gear wheel 68, by a spring 84 that also holds the rod 79 or a roller on the rod against the cam 80. The gear wheel 68, 66 will be turned, and as clutch member 65 is at this time coupled to gear wheel 66, the shaft 64 with spiral pinion 63 will revolve and turn the spiral gear 60 thus lowering the threaded stem 59 and platen 58 of the box E, the rate of descent being just sufficient to give each plug fed to the box the same degree of pressure. After the box has received its full complement of plugs, the platen will have entered a recess 85 in the table 24 until its top is flush with said table thus permitting the filled box to be removed and an empty one substituted, after which the platen 58 will be carried quickly to the top of the box by the following means.

The gear wheel 73 drives a large gear wheel 86 on a shaft 87 that engages a small idle pinion 88 meshing with a like pinion 89 on a shaft 90. A gear wheel 91 on the shaft 90 drives the small pinion 67 on shaft 64. As soon as an empty box E is positioned over the platen 58, the projection 92 on cam 80 will be in position to push the rod 79 and shift the lever 78 carrying the clutch member 75 into engagement with the teeth 74 on sleeve 72 and rotate the gear wheel 73, that, through the connections described will impart a rapid reverse motion to the spiral gear wheel 60 and quickly elevate the platen 58 to its full height whereupon the cam elevation passing the rod 79 the parts shifted will be returned by the spring 84 and the platen again commence to move downward. As the shaft 87 rotates, a cam 93 thereon acts on lever 77 to shift it and clutch member 65 into engagement with the clutch face on pinion 67, thus insuring the rotation of the spiral gear wheel in the proper direction. At the proper time the cam 93 disengages the lever 77 and the parts are returned by a spring 94. A link 95 extends from the lever 77 to an arm 96 on the pawl 62 to disengage said pawl from the ratchet wheel when the latter and the spiral gear wheel 60 are turned in reverse direction to raise the threaded stem of the platen.

Revolving with the gear wheel 68 and loosely on the shaft 69 is a miter gear wheel 97 that turns a like gear wheel 98 on the lower end of an upwardly inclined shaft 99, the upper end of which has a miter wheel 100 that drives a similar gear 101 on the shaft 40. By this means power is conveyed to the cams 38, 39 and 55.

The boxes E, are moved into filling position by means hereinafter described, being held in place by a rigid front plate 102, and a folding rear plate 103 yieldingly maintained in vertical position by a spring 104. Slidable in grooves in the table 24 on two sides of the box filling position and flush with the top of the table are two reciprocating bars 105, their rear ends 106 extending above the table and each provided with an inwardly projecting spring actuated pawl 107. On the under face of each bar 105 at its front end is a rack 108 in mesh each with a pinion 109 on a horizontal shaft 110 carried in bearings on the framework, said shaft also having a third pinion 111 that is engaged by teeth on one side of a vertical rack bar 112 raised by a cam 113 acting against a roller or stud on said rack bar to quickly move the bars 105 toward the front of the machine into position to engage the pawls 107 thereon with lugs e on the sides of the box E. The rack bar 112 is drawn downward by a spring 114 to rotate shaft 110 carrying the bars 105 to the rear and pushing the boxes from beneath the opening 26, transferring them to the belt conveyer C.

Between the tracks B, B' are the horizontal belt conveyers C, D, arranged in pairs, as clearly shown in Fig. 1, the conveyer C traveling from the pressing machine A to remove filled boxes therefrom, and the conveyer D moving toward said machine bringing boxes thereto to be emptied. The belt conveyer C comprises two endless chains 115, 116, Figs. 3 to 7, passing around sprocket wheels 117, 118, at opposite ends, the sprocket wheels 117 being mounted on the ends of a shaft 119. Outside one sprocket wheel 117 is a spur gear wheel 120 for driving the conveyer, and a miter gear wheel 121 is fastened on the same shaft outside the other sprocket wheel. The endless chains 115, 116 of the conveyer D pass around sprocket wheels 122, 123, the wheels 122 being fixed on a shaft 124, in line with shaft 119, on which shaft is fixed a miter gear 125. The two miters 121, 125 intermesh with an idle miter gear 126, and as arranged, the sprocket wheels 122 are given a reverse rotation to sprockets 117 and move the conveyer D in a direction opposite that of conveyer C. The conveyers are driven by a motor 127 on the shaft of which is a pinion 128 driving a gear wheel 129 that in turn rotates a broad faced gear wheel 131 mounted to turn freely on a longitudinally extending shaft 132 rotatable in bearings. On one end of the hub of the gear wheel 131 are a series of clutch teeth 133 that engage a clutch member 134, fast on the shaft 132, when moved in one direction, a friction disk 135 on the opposite side of the gear wheel 131 engages a friction clutch 136 when the gear wheel is moved in the other direction. The gear wheel 131 is moved longitudinally on shaft 132 by means of a forked lever 137, engaging by one end said shaft and by the other end through a link 138 with a hand operated lever 139 provided with a latch of well known form by means of which the gear wheel may be locked in position to revolve with the clutch member 134, the friction clutch 136, or in an intermediate position wholly disconnected.

Fixed on shaft 132 is a worm 140 arranged to drive a worm wheel 141 on a cross shaft 142, and a pinion 143 on said shaft turns a large gear 144 on a shaft 145 that carries a pinion 146 through which the gear wheel 120 on the conveyer shaft 119 is given motion and the two conveyers moved slowly in the proper direction.

The chains 115, 116 are made of links of such length that preferably two such links equal the width of a box E. Each alternate link 147 of each chain is wider vertically to form a support for the lugs e on the boxes, which are thus carried by said chains from end to end of the conveyer. Each chain link 147 has an upwardly projecting finger 148 that engages behind the supported lug e and insures the movement of the box. The upper run of each chain is sustained upon the edge of a plate 149, parallel to the chain, yieldingly mounted on springs 150 supported on stiff frame plates 151 that extend crosswise below the two conveyers C, D. Between the sustaining plates 149 of each conveyer is a flat run way 152 over which the boxes move, they being held above the runway a slight distance during the movement of the conveyers.

Above each conveyer is a pressure mechanism comprising a longitudinal bar 153 extending the length of the conveyer, from the under side of which bar a plurality of blocks 154 depend equal in number to the number of boxes that can be maintained on a conveyer and similarly spaced. On the under side of each block is fastened a pressure plate 155 of a size to snugly enter a box and press upon the plugs therein. Parallel with the bar 153 and overlying the ends of the pressure plates 155 are two longitudinal strips 156 held downward on said plates by a number of spiral springs 157 bearing on said strips and against washers 158 on the upper ends of pins 159 attached to the pressure plates and passing freely through openings in the strips 156 and through the springs 157. When the conveyers have been filled with boxes of plugs, the clutch 133, 134 is disconnected to stop the movement of said conveyers with the boxes immediately under the pressure plates 155. The bars 153 are then lowered, by means described hereinafter, whereupon the pressure plates enter the boxes and the strips 156 bear on the tops thereof. The springs 157 overcome the springs 150 and press the chains 115, 116 and their sustaining plates 149 downwardly until the bottoms of the boxes E rest on the runway 152. The plates 155 at the same time enter the boxes and press upon the plugs therein, holding them against the runway until set.

Midway between the conveyers C, D are several columns 160 on the top of which, mounted to turn in bearings 161, is a horizontal screw threaded shaft 162 on which is secured a sprocket wheel 163 driven by a chain 164 from a sprocket wheel 163 driven by a chain 164 from a sprocket wheel 165 fast on one end of a sleeeve 166 on the opposite end of which is the friction clutch 136. A nut 167 is threaded on the shaft 162 near each column 160 from the under side of each of which nuts a pin projects that engages the slotted ends 168 of two bell crank levers 169 pivoted each on a bracket 170 projecting horizontally form one side of the column 160. The other arms of the levers 169 are connected each to a toggle 171, said toggles being pivoted at one end on the column and their other ends each to a bar 153. There are, as shown, two toggles adjacent each column one for each bar 153, and as many columns as the length of the conveyers calls for.

When the friction disk 135 is coupled to the friction clutch 136, the motor 127 through the gear wheels 129, 130 and 131, sprocket wheel 163, chain 164, and sprocket wheel 165 turns the threaded shaft 162, whereupon the nuts 167 are moved longitudinally on said shaft, the bell crank levers 169 rocked and the toggles 171 straightened, thereby pushing the bars 153 downward and the pressure plates 155 upon the plugs to compress them. After reaching full compression the hand lever 139 is moved to an intermediate position to disconnect the friction clutch and keep the toothed clutch 133, 134 from becoming engaged. The plugs of tobacco remain under this compression for several hours and at the end of the required time a hand lever 172 is operated to couple a clutch 173, upon the sliding member of which is a gear wheel 174 driven by an idle gear 175 from a gear wheel 176 fast on a shaft 177 upon which the broad faced gear wheel 130 is mounted. Because of the idle gear 175 in the train, the sprocket wheels and chain and screwshaft will be given a reverse rotation, the nuts 167 caused to travel toward the columns and, through the bell crank levers and toggles, the bars 153 will be raised and the pressure plates withdrawn from the boxes. The strips 156 will also be lifted from the boxes and the springs 150, relieved of pressure, will again raise the sustaining plates 149, chains 115, 116 and the boxes from the runway. Upon the restoration of the above parts to normal position, the clutch 173 is disconnected and the machines A and A' moved into position at the ends of the conveyers C, D. The hand lever 139 is operated to connect the toothed clutch 133, 134 and cause the conveyers to advance, carrying the filled boxes from the machine A by conveyer C to the discharge mechanism of machine A' and the boxes filled by the latter machine by conveyer D to machine A to be discharged.

The boxes E are carried by the fingers 148 of the conveyer chains 115, 116 between rearwardly projecting elevated ends 178 of two bars 179 mounted to slide in grooves in the table 24 of the machines A, A' to and from the delivering conveyer. Spring controlled pawls 180 on the elevated ends of the bars 179 engage behind the lugs e on each box and slide it forward against a stop plate 181, arresting each box over an opening 182 in the table 24. Each bar 179 has a rack 183 on its under side with which is engaged a pinion 184 on a shaft 185. Another pinion 186 is also mounted on the same shaft and with shaft 185 and pinions 184 is rotated by a vertical rack bar 187 raised by a cam 188 on the shaft 87. After the box is in position over the opening 182, the plugs therein are pushed out by a plunger 189 through said opening into a temporary holder 190, pivoted at 191 to the framework. The plunger 189 is secured on the lower end of a stem 192 sliding in a guide 193, the upper end of which stem is connected to the free end of a lever 194 pivoted on a bracket 195 and operated to raise and lower said plunger by a bar 196 pivoted on said lever and extending downward to a cam 197 on shaft 87 with which a pin or roller 198 on said bar engages. The plunger is raised by the cam 197 and depressed by gravity or by a spring 199.

Above the stop plate 181 is a bar 200 that slides transversely of the bars 179 and above them and has a rearwardly projecting finger 201 on one end that extends along the right side of a box when in position to be emptied. Upon the return of plunger 189 after ejecting the plugs, the bar 200 is moved to the left, the finger 201 engaging the box, slides it between the fixed plate 102 and swinging plate 103 beneath the filling opening 26 in the platform 25. A rack 202 on the under side of the bar 200 is engaged by a pinion 203 on a stub shaft. A second pinion 204 fixed to pinion 203 is rotated by a vertical rack bar 205 connected at its lower end to a lever 206 that is raised by a cam 207 on the shaft 87. Gravity or a spring conveniently attached causes the descent of the rack bar.

As heretofore stated the plunger 189 pushes the pressed plugs out of the box E into the temporary swinging holder 190. After receiving the plugs, the holder, which is open on its rear side, is given a quick turn of ninety degrees by the contraction of a spring 208 connected to the holder and to the framework 20. A cam 209 on shaft 87 controls as it rotates the downward movement of the holder and returns it to upright position through a bar 210 operated by the cam connected to an arm 211 on the pivot 191 of the holder. When the holder 190 swings downward it deposits the plugs on the slotted conveyer belt 212 with sufficient shock to loosen the separating plates b from the plugs, the plates dropping between the slots of the belt onto an inclined chute 213 thereunder and down the chute onto a belt 214 and from the machine. The groups of plugs too thick to pass between the slots are removed by conveyer belt 212 in lots ready to be packed in boxes. The separating plates may be perfectly smooth, or provided with characters in relief thereon indicating a trade-mark, trade name, manufacturer or whatever desired, the characters on the plates being impressed in each plug. Spaced transverse ribs may also be made on the plates to form grooves in the plugs indicating cutting points.

It is understood that the embodiment of my invention described above is only one of the many forms or embodiments the invention may take, and I do not wish to be limited in the practice of my invention, nor in the scope of my claims, to the embodiment set forth.

What I claim is:—

1. In an apparatus for pressing plug tobacco, the combination with a plurality of spaced horizontal conveyers, means for automatically filling mold boxes adapted to travel past the receiving ends of said conveyers and to stop in line with any one of them to place a succession of filled mold boxes thereon, and pressure means above each conveyer for simultaneously subjecting the plugs in all the mold boxes on said conveyer to sustained compression.

2. In an apparatus for pressing plug tobacco, the combination with a plurality of spaced horizontal conveyers, means including a device for feeding plugs of tobacco singly to a mold box and a plunger for pressing said plugs as they enter said box, said means adapted to travel past the receiving ends of said conveyers and to be stopped in line with any one of them to place a succession of filled mold boxes thereon, and pressure means above each conveyer for simultaneously subjecting the plugs in all the mold boxes on said conveyer to sustained compression.

3. In a system for pressing plug tobacco, the combination of means for feeding plugs to a form box and pressing each plug as it enters said box, means for transporting filled boxes from the pressing means and supporting them, and pressing means above the transporting means for simultaneously subjecting the plugs thereon to sustained compression.

4. In a system for pressing plug tobacco, the combination of means for feeding plugs to a form box and pressing each plug as it enters said box, means for transporting filled boxes from the pressing means and supporting them, pressing means above the transporting means for simultaneously subjecting the plugs in all the boxes thereon to sustained compression, and means for ejecting the plugs from each box after compression.

5. In a system for pressing plug tobacco, the combination of two sets of means each including mechanism for feeding plugs to a form box and pressing each plug as it enters said box, duplicate parallel carriers traveling in opposite directions each for transporting filled boxes from one of said means and supporting said boxes, and pressing means above each transporting means for simultaneously subjecting the plugs in all the boxes thereon to sustained compression.

6. In a system for pressing plug tobacco, the combination of two sets of means each including mechanism for feeding plugs to a form box and pressing each plug as it enters said box, duplicate parallel carriers traveling in opposite directions each for transporting filled boxes from one of said means and supporting said boxes, pressing means above each transporting means for simultaneously subjecting the plugs in all the boxes thereon to sustained compression, and means adjacent the delivery end of each transporting means for ejecting the plugs from each box after compression.

7. In a system for pressing plug tobacco, the combination with a plurality of horizontal conveyers grouped in pairs, the conveyers of each group traveling in opposite directions, carriages movable in line with each end of a pair of conveyers, each carriage carrying a device for feeding plugs to a form box, a plunger for pressing each plug as it enters said box, and means for transferring the filled boxes singly to the outgoing conveyer, a pressing mechanism over each conveyer for simultaneously subjecting the plugs in all the boxes on said conveyers to sustained compression, and an ejecting mechanism on each carriage for pushing the plugs out of the boxes as they are delivered thereto by the incoming conveyer.

8. In a system for pressing plug tobacco, the combination with a plurality of horizontal conveyers grouped in pairs, the conveyers of each pair traveling in opposite directions, carriages movable in line with each end of a pair of conveyers, each carriage carrying a device for feeding plugs to a form box, a plunger for pressing each plug as it enters said box, and means for transferring the filled boxes singly to the outgoing conveyer, a pressing mechanism over each conveyer for simultaneously subjecting the plugs in all the boxes on said conveyers to sustained compression, an ejecting mechanism on each carriage for pushing the plugs from the boxes as they are delivered thereto by the incoming conveyer, and means for transferring the emptied box to the feeding and pressing device.

9. In a system for pressing plug tobacco, the combination with a plurality of horizontal conveyers grouped in pairs, the conveyers of each pair traveling in opposite directions, a carriage movable into line with each end of a pair of conveyers carrying mechanism for feeding plugs to a form box, means for feeding a sheet metal separating plate upon each plug of tobacco, a plunger for pushing said plugs and plates into the form box and pressing each plug as it enters therein, means for transferring the filled boxes one at a time to the outgoing conveyer, a pressing mechanism over each conveyer for simultaneously subjecting the plugs in all the boxes on said conveyers to sustained compression, an ejecting mechanism on each carriage for pushing the plugs from the boxes as they are delivered thereto by the incoming conveyer, and means for transferring the emptied boxes to the feeding and pressing device.

10. In a system for pressing plug tobacco, the combination with a plurality of horizontal conveyers grouped in pairs, the conveyers of each pair traveling in opposite directions, a carriage movable in line with each end of a pair of conveyers carrying mechanism for feeding plugs to a form box, means for feeding a sheet metal separating plate upon each plug of tobacco, a plunger for pushing said plugs and plates into the form box and pressing each plug as it enters therein, means for transferring the filled boxes one at a time to the outgoing conveyer, a pressing mechanism over each conveyer for simultaneously subjecting the plugs in all the boxes on said conveyers to sustained compression, an ejecting mechanism on each carriage for pushing the plugs from the boxes as they are delivered thereto by the incoming conveyer, means for separating the plugs and plates after ejection from the form boxes, and means for transferring the emptied form boxes to the feeding and pressing device.

11. In combination, a pair of oppositely moving conveyers, means at each end of said conveyers for filling and packing plugs of tobacco into form boxes and placing them successively on the outgoing conveyer, means above each conveyer for simultaneously subjecting the plugs in all the boxes on said conveyers to sustained compression, and means for removing the boxes from the incoming end of the conveyers and ejecting the pressed and finished plugs therefrom.

12. In combination, a plurality of independently movable form boxes, means for moving the boxes into position to be filled, means for feeding plugs of tobacco singly above each box to be filled, a plunger for pushing each plug into the box and subjecting it to pressure, a temporary plug support coöperating with the plunger, means for moving the temporary plug support into the box from the side of the box opposite the plunger and for moving the plug downwardly through each mold box at a rate of speed commensurate with the filling of the mold box to insure the same degree of pressure to each plug, means for engaging the filled mold box to remove the same after being filled, and means for guiding the filled box from under the plunger.

13. In a plug pressing machine, in combination, means for feeding plugs of tobacco singly above a mold box, a plunger for pushing each plug into said box and subjecting it to pressure, a platen forming a temporary support for the plugs movable through said box, and means actuated by a continuously moving part of the machine for moving said platen quickly into the box when empty and slowly out of the same as it is filled.

14. In a plug-pressing machine, in combination, means for feeding plugs of tobacco singly above a mold box, means for feeding a separating plate upon each plug, a plunger for pushing each plug and plate into said box and subjecting said plug to pressure therein, a platen forming a temporary support for the plugs movable through said box, means actuated by a continuously moving part of the machine for moving said platen quickly into the box when empty and slowly out of the same as it fills, and means actuated by a continuously moving part of the machine for removing a filled box and substituting an empty one.

15. In combination, means for feeding plugs of tobacco singly above a mold box, a plunger for pushing each plug into said box and pressing the same, a platen forming a temporary support for the plugs movable through said box, means for moving said platen quickly into the box when emptied and slowly out of the same as it is filled, means for carrying filled boxes from the filling and pressing means, and a pressing mechanism above the carrying means for simultaneously subjecting a plurality of boxes to sustained compression.

16. In combination, mechanism for feeding plugs of tobacco singly to a mold box and pressing them therein, a carrier for supporting the filled boxes and transporting them from the filling and pressing mechanism, and a pressing means associated with said carrier for simultaneously applying pressure to the plugs in all the boxes on the carrier and maintaining said pressure until the plugs are set.

17. In combination, mechanism for feeding plugs of tobacco singly to a mold box and pressing them therein, a carrier for supporting the filled boxes and transporting them from the filling and pressing mechanism, said carrier comprising a pair of endless belts sustaining the boxes, a runway beneath the boxes and slightly spaced therefrom, and resilient means over which the belts run to hold the boxes above the runway while moving, and a pressing means associated with said carrier for depressing the boxes into contact with the runway and simultaneously applying pressure to the plugs in all the boxes on the carrier and maintaining said pressure until the plugs are set.

18. In a tobacco-pressing machine, in combination, a framework supporting a table, and a platform over the table between which table and platform a mold box is placed to be filled, feeding means for delivering plugs of tobacco singly above an opening in said platform leading to the mold box below, a plunger for pushing said plugs into the mold box and pressing them, a platen movable in the mold box to sustain the plugs under pressure, means for lowering said platen as the plugs enter the box to maintain equal pressure on each plug, and finally withdraw the platen from the lower end of the mold box, means for alining an empty mold box over the platen, and means actuated by a continuously moving part of the machine to quickly advance the platen into the upper part of the empty mold box.

19. In a machine for pressing tobacco, in combination, a framework supporting a table, and a platform over said table between which table and platform a mold box is placed to be filled, feeding means for delivering plugs of tobacco singly above an opening into said platform leading to the mold-box below, a plunger for pushing said plugs into the mold box and pressing them as they enter, a platen movable in the mold box to sustain the plugs under pressure, means for lowering said platen as the plugs enter the box to maintain equal pressure on each plug, finally withdrawing the platen from the lower end of the mold box, means for engaging and removing the filled box and substituting an empty one, and means actuated by a continuously moving part of the machine to quickly advance the platen into the upper part of the empty mold box.

20. In combination, a framework supporting a table, and a platform over said table between which table and platform a mold box is placed to be filled, feeding means for delivering plugs of tobacco singly above an opening into said paltform leading to the mold-box below, a plunger for pushing said plugs into the mold box and pressing them as they enter, a platen movable in the mold box to sustain the plugs under pressure, means for lowering said platen as the plugs enter the box to maintain equal pressure on each plug, a slowly moving conveyer upon which filled mold boxes are placed to be taken from the box filling means, and means for transferring the boxes from the filling means to the conveyer.

21. In combination, a framework supporting a table, and a platform over said table between which table and platform a mold box is placed to be filled, feeding means for delivering plugs of tobacco singly above an opening into said platform leading to the mold-box below, a plunger for pushing said plugs into the mold box and pressing them as they enter, a platen movable in the mold box to sustain the plugs under pressure, means for lowering said platen as the plugs enter the box to maintain equal pressure on each plug, a slowly moving conveyer upon which filled mold boxes are placed to be taken from the box filling means, means for transferring the boxes from the filling means to the conveyer, and a pressure mechanism above the conveyer for simultaneously subjecting the plugs in all the boxes to sustained compression.

22. In a machine for pressing tobacco, in combination, a framework supporting a table, and a platform over the table between which table and platform a mold-box is placed to be filled, feeding means for delivering plugs of tobacco singly above an opening in said platform leading to the mold box below, a plunger for pushing said plugs into the mold box and pressing them as they enter, a platen movable in the mold box to sustain the plugs under pressure, a threaded stem supporting said platen, a circular nut having spiral peripheral teeth rotatable on said stem between bearings for raising and lowering said platen, a spiral pinion engaging the teeth on said nut adapted to be rotated in either direction, means actuated by a moving part of the machine for rotating said pinion slowly to withdraw the platen slowly while compressing the plugs, and means driven by a continuously moving part of the machine to drive the pinion rapidly to advance the platen into the upper part of an empty mold-box.

23. In a machine for pressing tobacco, in combination, a framework supporting a table and a platform over the table between which table and platform a mold-box is placed to be filled, feeding means for delivering plugs of tobacco singly above an opening in said platform leading to the mold box below, a plunger for pushing said plugs into the mold box and pressing them as they enter, a toggle for operating the plunger, yielding means between the plunger and the toggle, a platen movable in the mold box to sustain the plugs under pressure, means for lowering said platen as the plugs enter the box to maintain equal pressure on each plug, means for guiding and moving empty mold-boxes into position above the platen, and means driven by a part of the machine to move the platen into the upper part of each empty mold-box before filling the same.

24. In a machine for pressing tobacco, in combination, a framework supporting a table and a platform over the table between which table and platform a mold box is placed to be filled, feeding means for delivering plugs of tobacco singly above an opening in said platform leading to the mold box below, a plunger for pushing said plugs into the mold box and pressing them as they enter, a slide in which said plunger is yieldingly mounted, resilient means between the plunger and said slide, a toggle connected to said slide for operating the same, means for operating the toggle, a platen movable in the mold box to sustain the plugs under pressure, means operated coincidentally with the movement of the plunger for lowering said platen as the plugs enter the box to maintain equal pressure on each plug, means for guiding and moving empty mold-boxes into position above the platen, and means driven by a part of the machine to move the platen into the upper part of each empty mold-box before filling the same.

25. In combination, a machine for filling mold boxes singly with plugs of tobacco and pressing said plugs as they enter said box, a horizontal carrier adjacent said filling and pressing machine, means on said machine for transporting filled boxes to said carrier, and pressing mechanism above said carrier for simultaneously pressing the plugs in all the boxes thereon and maintaining said pressure.

26. In combination, a traveling machine for filling mold boxes singly with plugs of tobacco, and pressing said plugs as they enter said box, a plurality of moving carriers arranged in parallel relation, said machine adapted to be brought in line with an end of any one of said carriers, means on said machine for transporting the filled boxes one at a time onto the adjacent carrier, and pressing means above each carrier for simultaneously subjecting the plugs in all the boxes thereon to sustained compression.

27. In combination, a machine for filling mold boxes singly with plugs of tobacco and pressing said plugs as they enter said box, a horizontal carrier adjacent said filling and pressing machine comprising a pair of endless chain belts, a yielding plate for supporting the upper run of each belt, resilient means sustaining each plate, and a platform or runway between the plate, means for transferring filled boxes from said machine to the carrier, where they are supported above the runway by said chain, and a pressure mechanism above said carrier adapted to depress said boxes into contact with the runway and simultaneously subject the plugs in all the boxes to sustained compression.

28. In combination, a machine for filling mold boxes singly with plugs of tobacco and pressing said plugs as they enter said box, a horizontal carrier adjacent said filling and pressing machine, means on said machine for transferring filled boxes to said carrier, and a pressing mechanism above said carrier comprising a horizontal bar, means for raising and lowering the same, and a plurality of blocks depending from the underside of said bar to enter the boxes on said carrier and compress the plugs therein.

29. In combination, a machine for filling mold boxes singly with plugs of tobacco and pressing said plugs as they enter said box, a horizontal carrier adjacent said filling and pressing machine, means on said machine for transferring filled boxes to said carrier, and pressing mechanism above said carrier comprising a horizontal bar, means for raising and lowering said bar and holding said bar for an indefinite time in either position, a plurality of pressure blocks depending from the underside of said bar and adapted to enter the filled boxes on said carrier and compress the plugs therein.

30. In combination, a machine for filling mold boxes singly with plugs of tobacco and pressing said plugs as they enter said box, a horizontal carrier adjacent said filling and pressing machine comprising a pair of endless chain belts, a yielding plate for supporting the upper run of each belt, resilient means sustaining each plate, and a platform or runway between the plates, means for transferring filled boxes from said machine onto the carrier where they are supported above the runway by said chains, and a pressure mechanism above the carrier comprising a horizontal bar, means for raising and lowering said bar, pressure blocks on the bar to enter the boxes and compress the plugs therein, and means carried by said blocks to force the boxes into contact with the runway.

31. In combination, a machine for filling mold boxes singly with plugs of tobacco and pressing said plugs as they enter said box, a horizontal carrier adjacent said filling and pressing machine to which filled boxes are transferred, said carried including a pair of endless chain belts, yielding means for supporting the upper run of each of said belts upon which run the filled boxes are supported, and a runway below the boxes, and a pressure mechanism above the carrier comprising a horizontal bar, a plurality of means simultaneously operated for raising and lowering said bar, yielding means carried by the bar for pressing the boxes into contact with the runway of the carrier, and pressure blocks on the bar to enter the boxes and subject the plugs therein to sustained compression.

32. In combination, a pair of machines each containing means for filling mold boxes with plugs of tobacco and pressing each plug as it enters the boxes, and means operating simultaneously with the filling and pressing means for ejecting plugs from boxes after sustained pressure, and a pair of horizontal carriers movable in opposite directions between said machines for removing boxes from the filling means of each machine and delivering them to the ejecting means of the other.

33. In combination, a pair of machines each containing means for filling mold boxes with plugs of tobacco and pressing each plug as it enters the boxes, and means operating simultaneously with the filling and pressing means for ejecting plugs from boxes after sustained pressure, a pair of horizontal carriers movable in opposite directions between said machines for removing boxes from the filling means of each machine and delivering them to the ejecting means of the other, and pressure means above each carrier for simultaneously subjecting the boxes on both carriers to sustained pressure.

34. In combination, a pair of machines each containing means for feeding plugs of tobacco to mold boxes, other means for feeding separating plates between the plugs, and means for pressing said plugs as they enter the boxes, means operating simultaneously with the filling and pressing means for ejecting plugs and plates from said boxes after sustained pressure, a pair of horizontal carriers movable in opposite directions between said machines for removing boxes from the filling means of each machine and delivering them to the ejecting means of the other, and means for subjecting the plugs in all the boxes on said carriers to sustained pressure.

35. In combination, a pair of machines each containing means for filling mold boxes with plugs of tobacco and pressing each plug as it enters the boxes, and means operating simultaneously with the filling and pressing means for ejecting plugs from boxes after sustained pressure, a pair of horizontal carriers movable in opposite directions between said machines for removing boxes from the filling means of each machine and delivering them to the ejecting means of the other, means for moving each box from the filling means to a carrier, presser means above the carriers for simultaneously subjecting the plugs in all the boxes thereon to sustain compression, means for moving the boxes singly from the carriers to the ejecting means, and means for transferring the boxes from the ejecting means to the filling and pressing means.

36. In combination, a pair of machines each containing means for filling mold boxes with plugs of tobacco and pressing each plug as it enters the box, and means operating simultaneously with the filling and pressing means for ejecting plugs from boxes after sustained pressure, a pair of horizontal carriers movable in opposite directions between said machines for carrying filled boxes from each machine to the ejecting means of the other, means above the carriers for pressing and holding under compression the plugs in the boxes on the carriers, a swinging holder below each ejecting means into which the pressed and finished plugs are delivered, and a conveyer upon which the holder deposits the plugs.

In testimony whereof I have hereunto set my hand in presence of two subscribing witnesses.

ROBERT B. DULA.

Witnesses:
J. GRANVILLE MEYERS,
E. H. BICKERTON.

Copies of this patent may be obtained for five cents each, by addressing the "Commissioner of Patents, Washington, D. C."